Figure 1:
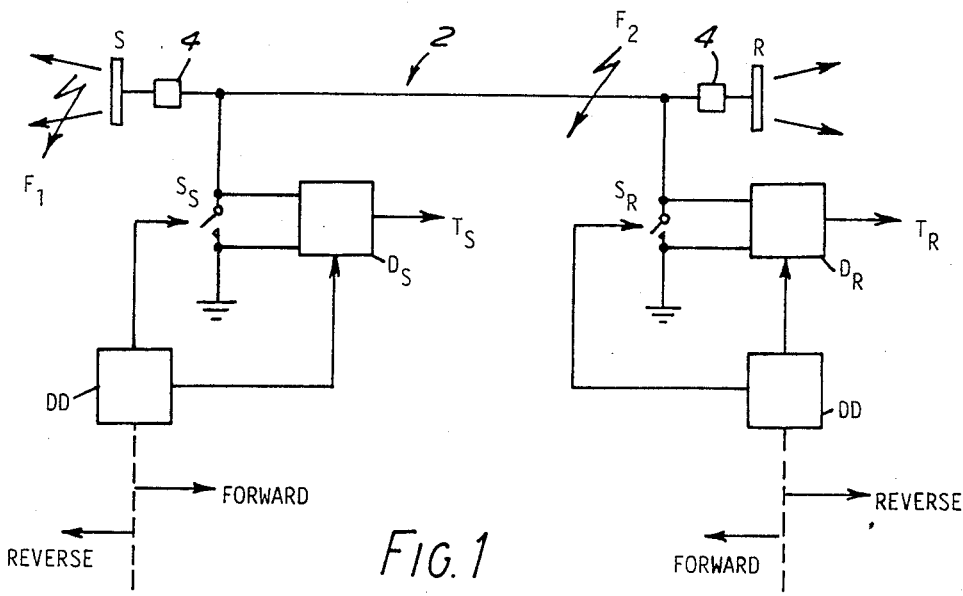

United States Patent [19]
Johns

[11] Patent Number: 4,922,368
[45] Date of Patent: May 1, 1990

[54] METHOD AND APPARATUS FOR DETECTING AND DISCRIMINATING FAULTS IN TRANSMISSION CIRCUITS

[75] Inventor: Allan T. Johns, Swindon, England

[73] Assignee: National Research Development Corporation, London, England

[21] Appl. No.: 275,723

[22] Filed: Nov. 23, 1988

[30] Foreign Application Priority Data

Nov. 24, 1987 [GB] United Kingdom ............. 8727490

[51] Int. Cl.$^5$ ............................................. H02H 3/00
[52] U.S. Cl. ..................................... 361/62; 361/68; 361/77
[58] Field of Search ............... 361/62, 63, 65, 64, 361/67, 68, 77, 79, 80, 81, 82

[56] References Cited

U.S. PATENT DOCUMENTS

| | | | |
|---|---|---|---|
| 4,438,475 | 3/1984 | Haley | 361/82 |
| 4,466,071 | 8/1984 | Russell, Jr. | 364/492 |
| 4,538,196 | 8/1985 | Sun et al. | 361/81 X |
| 4,751,604 | 6/1988 | Wilkinson | 361/68 |

OTHER PUBLICATIONS

UDO et al., "Impulse Noise Voltage in a Transmission Line Generated by the Fault" IEEE Transmission and Distribution Committee . . . May 5, 1966, pp. 1–14.

Balser et al., "A Microprocessor-Based Technique for Detection of High Impedance Faults", IEEE Transactions on Power Delivery, vol. PWRD-1, No. 3, Jul. 1986.

Aucoin et al., "Distribution Impedance Fault Detection Utilizing High Frequency Current Components", IEEE Transactions of Power Apparatus and Systems, vol. PAS-101, No. 6, Jun. 1982.

*Primary Examiner*—Derek S. Jennings
*Attorney, Agent, or Firm*—Cushman, Darby & Cushman

[57] ABSTRACT

Discriminating circuits are coupled to receive signals from a protected transmission circuit. Each discriminating circuit also receives from a direction detector signals indicating whether any fault which occurs is forward of, or reverse of, a predetermined point. The discriminating circuit is arranged to produce an output signal to trip a circuit breaker of the protected circuit only if a fault occurs within the protected circuit. In this respect, the discriminating circuit only outputs a trip signal if it receives within the same time period both a signal from the direction detector indicating that the fault is appropriately located, and high frequency signals from the protected circuit. The system thus utilizes the high frequency noise invariably generated when faults arise in transmission circuits. The system for protecting transmission circuits has the advantage that it provides good discrimination of faults without requiring communication links between discriminating circuits at each end of a protected circuit, as has previously been necessary.

41 Claims, 10 Drawing Sheets

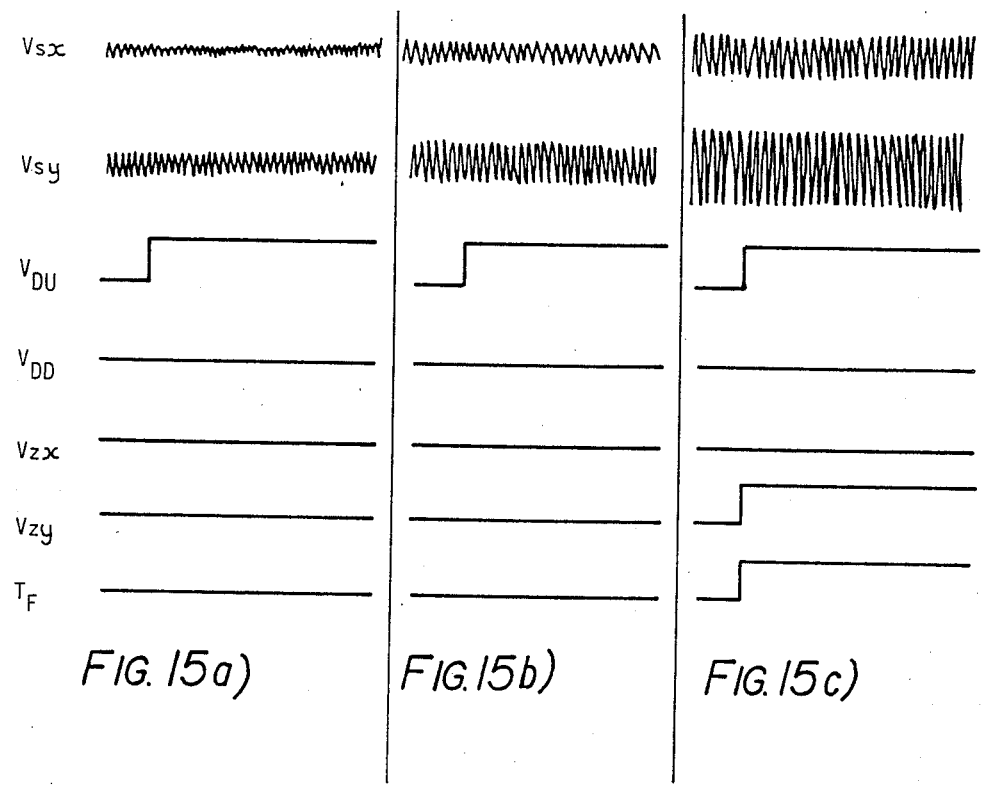

METHOD AND APPARATUS FOR DETECTING AND DISCRIMINATING FAULTS IN TRANSMISSION CIRCUITS

The present invention relates to a method and apparatus for detecting and discriminating faults in transmission circuits.

Particularly in transmission systems having a number of transmission lines carrying high voltages, it is important to ensure that any faults arising are detected so that the affected transmission line can be isolated from the system. Equally though, it is important to ensure that lines are not isolated unnecessarily.

It would be possible to monitor the transmission lines at a number of individual locations at which associated circuit breakers are provided. However, this involves total reliance upon locally derived information and therefore does not possess any inherent discrimination properties. Therefore there is a high risk of unnecessary shut-downs occurring.

Because of this, extremely high voltage (EHV) transmission systems, i.e. operating at voltages in excess of 150 KV, are generally provided with a unit type protection system in which monitoring equipment with an associated circuit breaker is provided at each end of a transmission line. A communication channel is provided to link the monitoring equipment at each end of the line such that the circuit breakers are tripped by information derived from more than one location. This system, therefore, has a high inherent capacity to discriminate between fault conditions, and in particular to distinguish between faults internal to the line, which require its isolation, and faults in neighbouring lines, which do not require the subject line to be shut-down.

However, the communication equipment itself needs to be reliable and secure, and it is therefore expensive to provide and to install. Furthermore, careful monitoring of the communication equipment itself is additionally required.

It is an object of the present invention to provide a method and apparatus for detecting and discriminating faults in transmission circuits which provides good discrimination without the need for communication links.

According to the present invention, there is provided a method of detecting and discriminating faults in a transmission circuit to which a discriminating means is coupled for receiving signals from said circuit, the method comprising detecting the existence of signals in the circuit having a frequency within a predetermined frequency range, generating one or more locative signals in response to a fault, said discriminating means being responsive to signals within the predetermined frequency range and to said locative signals, and causing said discriminating means to output a fault signal only when said discriminating means receives one or more selected locative signals within a time period in which the existence of signals within said predetermined frequency range is detected.

The present invention utilizes the high frequency noise invariably generated by a fault to aid in the discrimination of faults. It is well known that faults produce wideband noise, but previously this noise has been considered as a nuisance, and even a problem, because it can interfere with the communications by the previously necessary communication equipment.

The invention also extends to a method of protecting a transmission system against faults, the transmission system including one or more transmission circuits, respective discriminating means being coupled to each end of each circuit for receiving signals therefrom, the method comprising the steps of detecting the existence of signals in each transmission circuit having a frequency within a predetermined frequency range, generating one or more locative signals in response to the occurrence of a fault, each discriminating means being responsive to signals within the predetermined frequency range and to locative signals, and causing each discriminating means to output a fault signal only when said discriminating means receives one or more selected locative signals within a time period in which the existence of signals having a frequency within a predetermined frequency range is detected, each said fault signal being arranged to trip isolation means of the circuit associated with the discriminating means outputting said fault signal.

Preferably, each discriminating means is arranged to be conditioned by the locative signals it receives.

In one embodiment, the locative signals are generated by detector means associated with each end of each circuit, and the locative signals generated by each detector means are applied to the discriminating means coupled to the end of the circuit with which the detector means is associated.

Each detector means may also be coupled to receive signals from an adjacent circuit and be arranged to generate locative signals by comparing the signals received from two adjacent circuits.

In an embodiment, the or each discriminating means is coupled to a transmission circuit which includes three lines carrying the three phases of one supply. The signals received by the discriminating means from the three phases are combined, and the discriminating means is caused to output a fault signal only when the combined received signals have a frequency within said predetermined frequency range and are received within a time period in which said one or more preselected locative signals are received. In this respect, the received signals may be combined by summation in accordance with the formula n,−2n,n, or k,o,−k.

Although the fault induced noise is generally wideband, it is preferred to be responsive to frequencies within a narrow band of high frequencies. The lowest frequency of the band will be at least 50 Hz, and preferably the band will be cent red on a preselected centre frequency within the range 50 Hz to 500 kHz. In one embodiment, the predetermined frequency range is 300 ±5 kHz.

Preferably, the or each said discriminating means is tuned to said predetermined frequency range. In addition, the locative signals are arranged to indicate whether a fault is forward of, or reverse of, a predetermined point.

According to a further aspect of the present invention, there is provided apparatus for detecting and discriminating faults in a transmission circuit, comprising first detector means coupled to said transmission circuit to detect the existence of signals in the circuit having a frequency within a predetermined frequency range, and second detector means associated with said transmission circuit and arranged to generate locative signals in response to the occurrence of faults, and discriminating means coupled to said first and second detector means, said discriminating means being arranged to output a fault signal only when said discriminating means receives one or more selected locative signals within a time period in which the existence of signals within said predetermined frequency range is detected.

In an embodiment, the apparatus further comprises circuit breaker means in the transmission circuit coupled to said discriminating means, the circuit breaker means being triggerable upon receipt of a fault signal.

Preferably, said discriminating means comprises a circuit tuned to said predetermined frequency range, the output of said tuned circuit being applied to a level detector, and wherein the discriminating means further comprises logic means arranged to receive the output of the said level detector and said locative signals and to generate said fault signal when appropriate.

In a preferred embodiment, said tuned circuit is a band pass filter tuned to a centre frequency of 300 kHz ±5 kHz.

In one embodiment, the second detector means comprises one or more directional detectors each arranged to generate locative signals indicating whether a fault is forward of, or reverse of, a predetermined point.

In an alternative embodiment, the second detector means is coupled to its associated transmission circuit and to an adjacent transmission circuit, and said detector means further comprises means for comparing signals from the two adjacent circuits and generating locative signals in response to the comparison. Preferably, said first detector means comprises a first tuned circuit coupled to the associated transmission circuit and a second tuned circuit coupled to the adjacent transmission circuit, said first and second tuned circuits both being coupled to said comparing means and both being tuned to said predetermined frequency range, and wherein said first detector means further comprises attenuator means coupling said first and second tuned circuits.

The first detector may comprise a stack tuning circuit coupled to said transmission circuit. For example, the stack tuning circuit may include a coupling capacitance of a capacitance voltage transformer which is also coupled to the transmission circuit. This stack tuning circuit may be arranged as a band pass filter which is tuned to approximate to a short circuit to signals within said predetermined frequency range. Alternatively, the stack tuning circuit may be arranged to approximate to an open circuit to frequencies within said predetermined frequency range.

In an embodiment, the said stack tuning circuit comprises a parallel combination of a capacitance, an inductor, and a switch, which combination is coupled in series with a high voltage capacitance, and further comprising means for enabling selective locative signals to alter the position of said switch. Preferably, the high voltage capacitance is the stack capacitor of a capacitor voltage transformer connected to said transmission circuit. Conveniently, the stack tuning circuit is tuned to a frequency of 300 ±5 kHz.

The invention also extends to apparatus for protecting transmission systems comprising a plurality of transmission circuits, each end of each circuit being provided with apparatus for detecting and discriminating faults as defined above.

Generally, the or each transmission circuit comprises the three lines of a three phase supply, and the or each discriminating means is coupled to the three lines of a respective circuit by way of summation means and a respective stack tuning circuit coupled to each said line.

Figure 2:
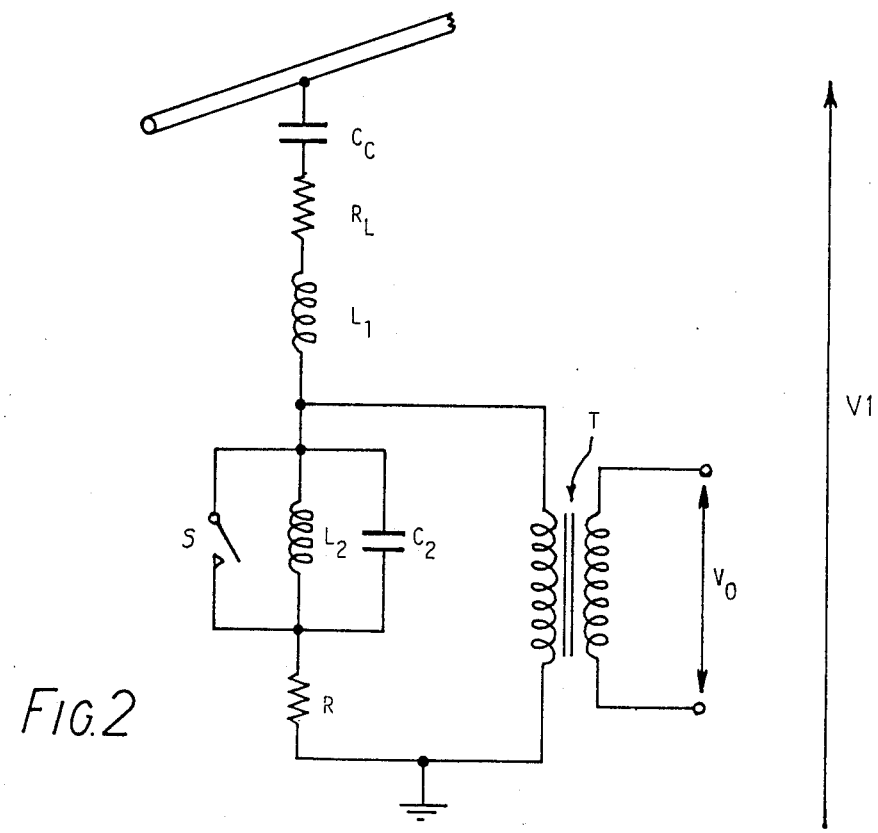
Figure 3:
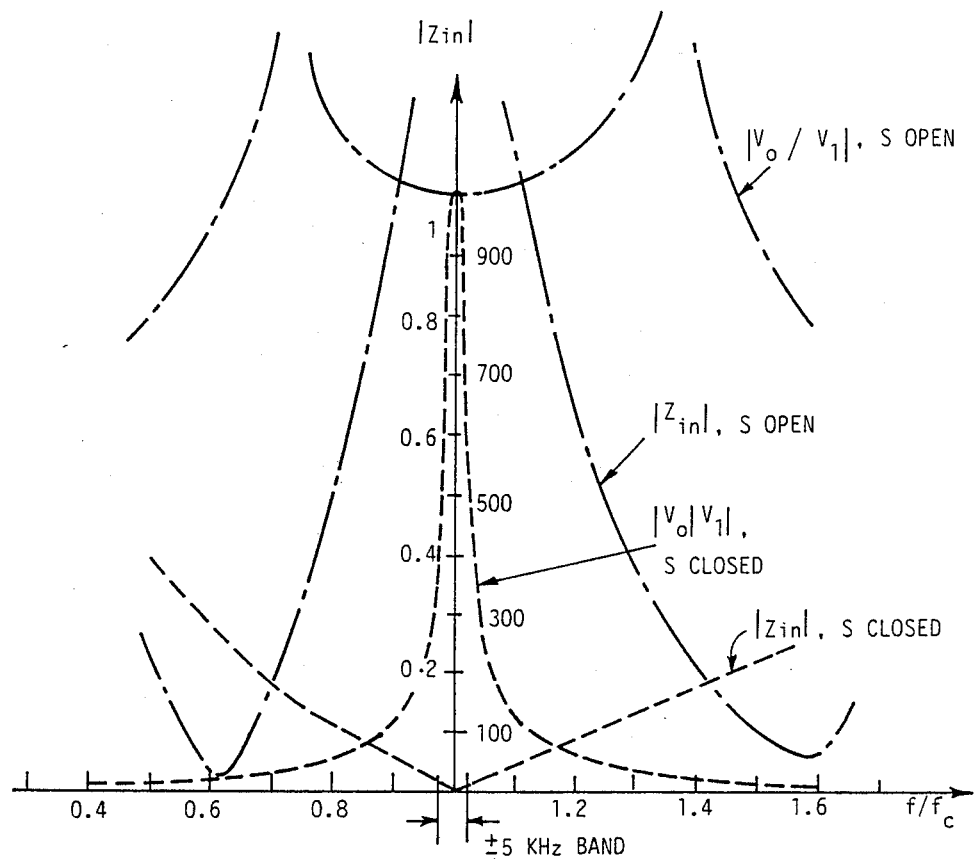
Figure 4:
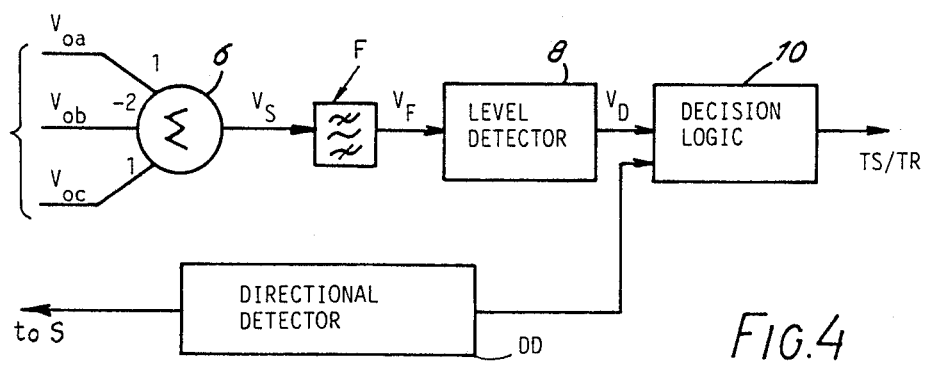
Figures 5A, 5B:
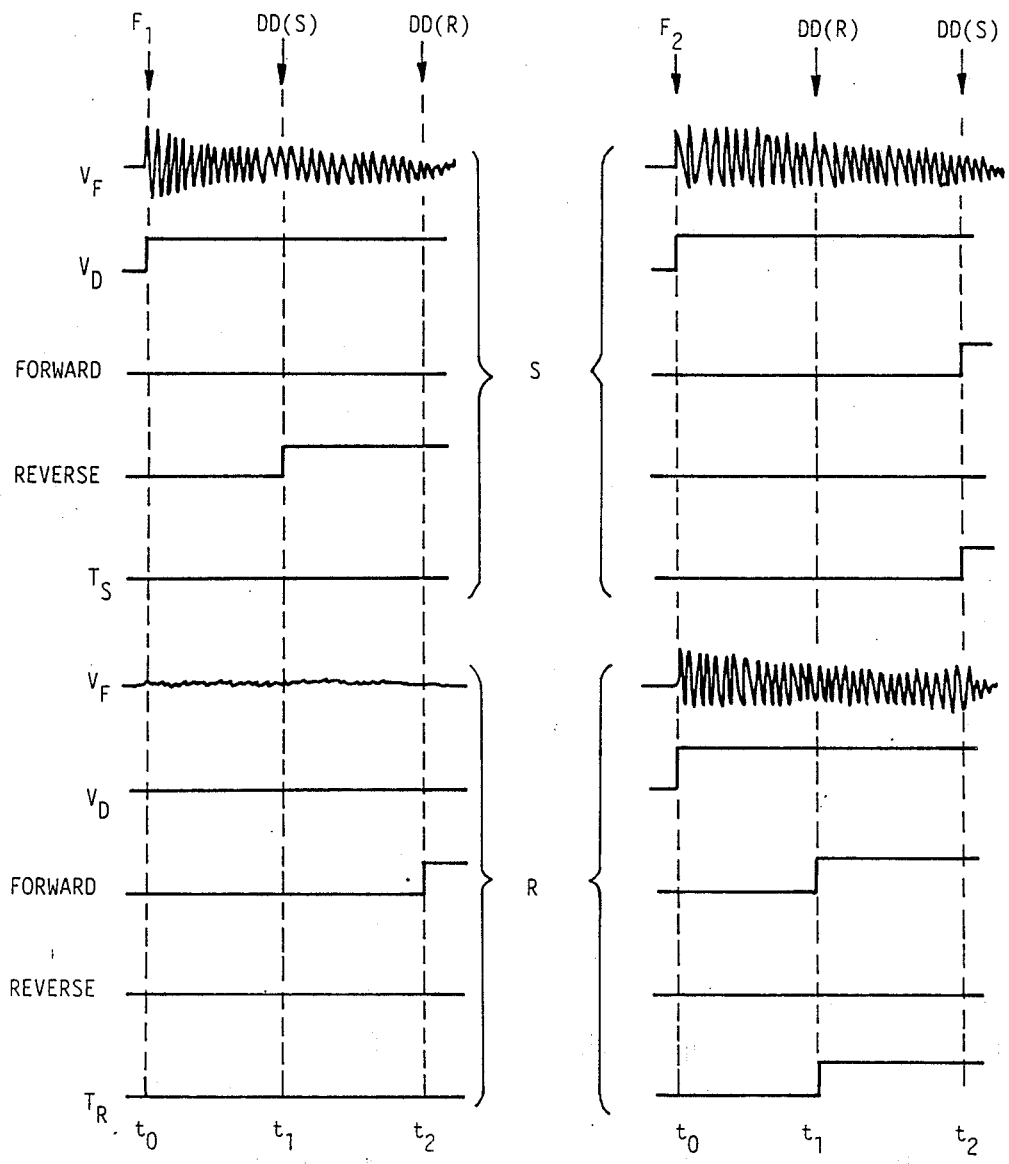
Figure 6:
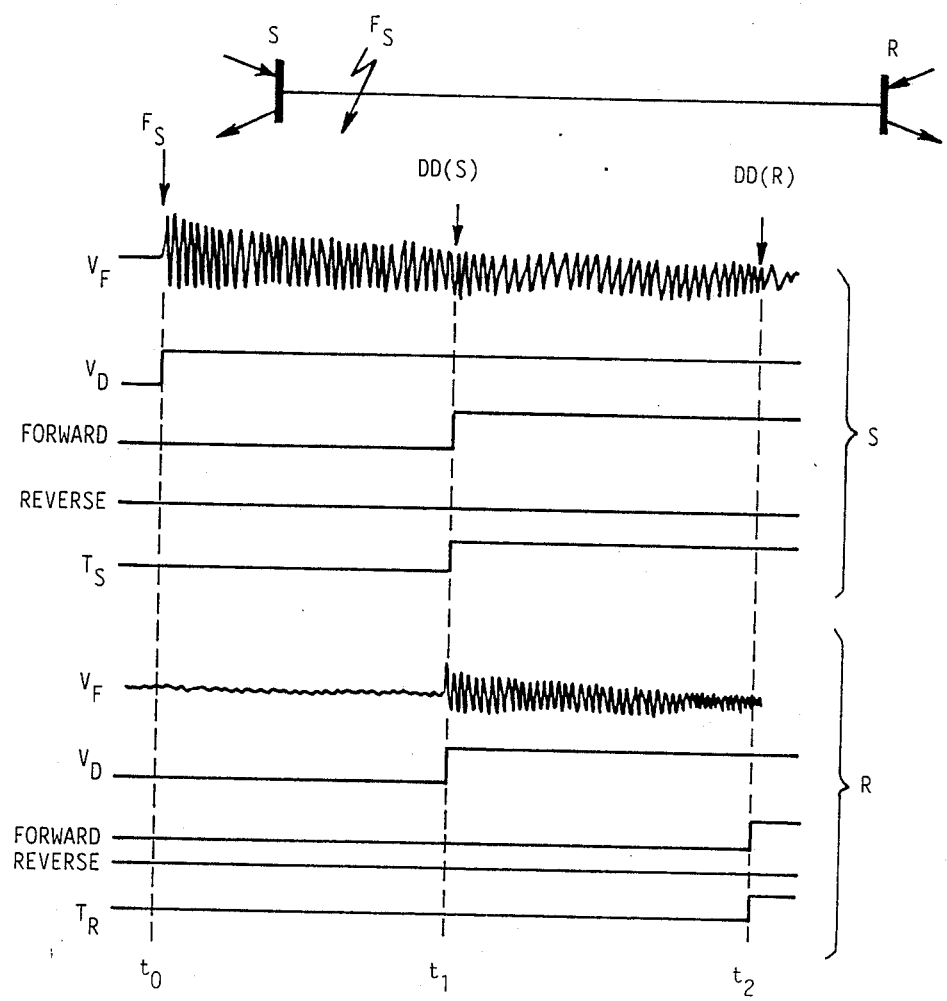
Figures 7A, 7B:
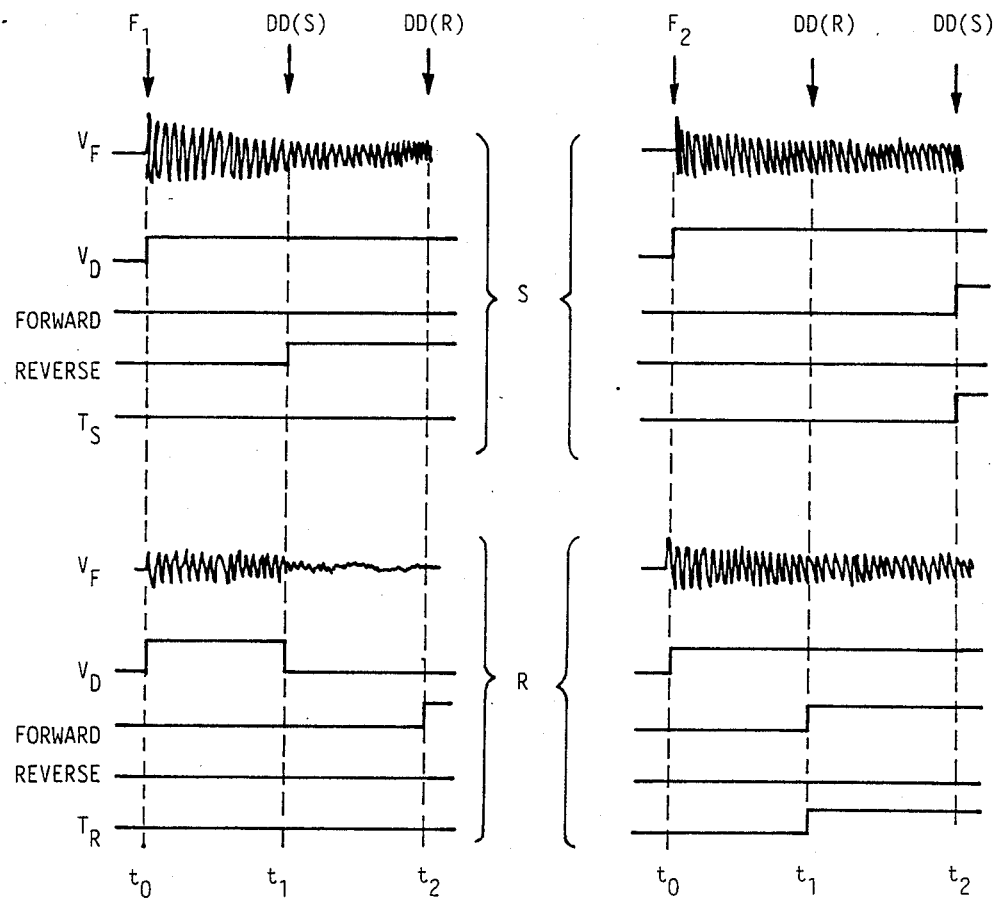
Figure 8:
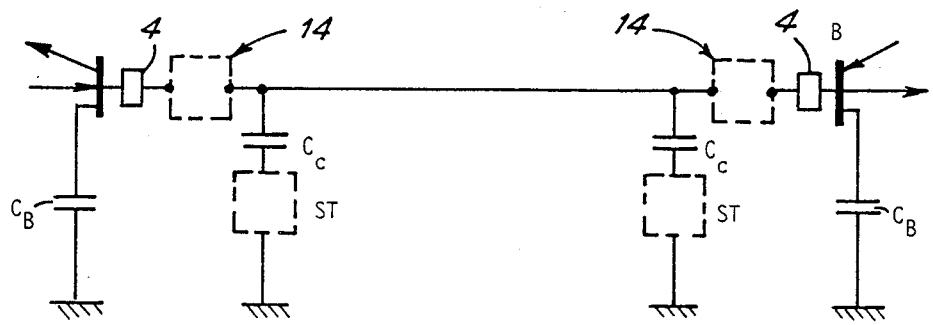
Figure 9A:
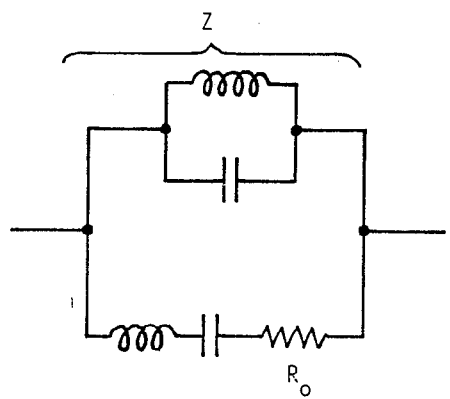
Figure 9B:
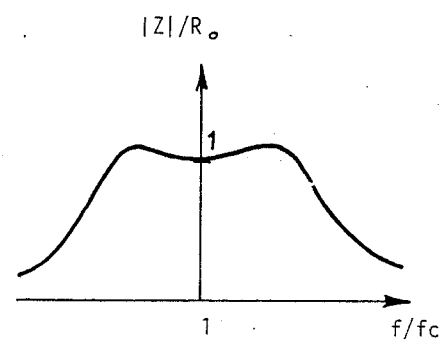
Figure 10:
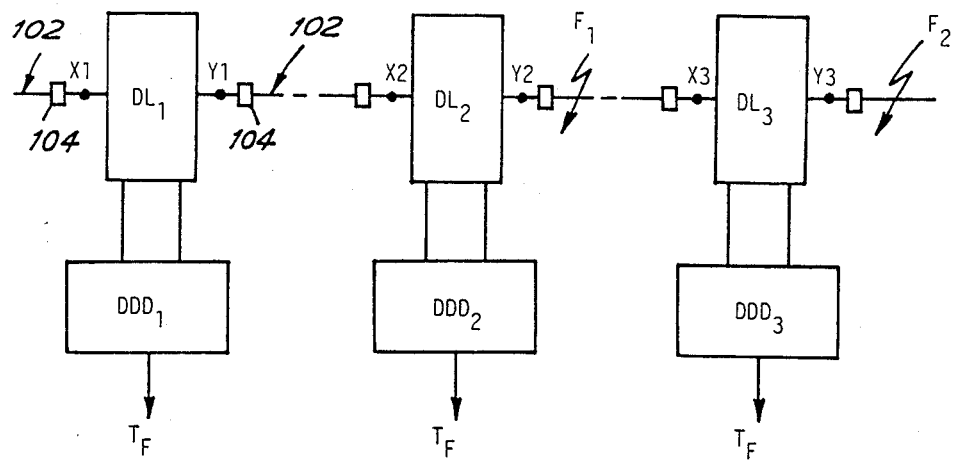
Figure 11:
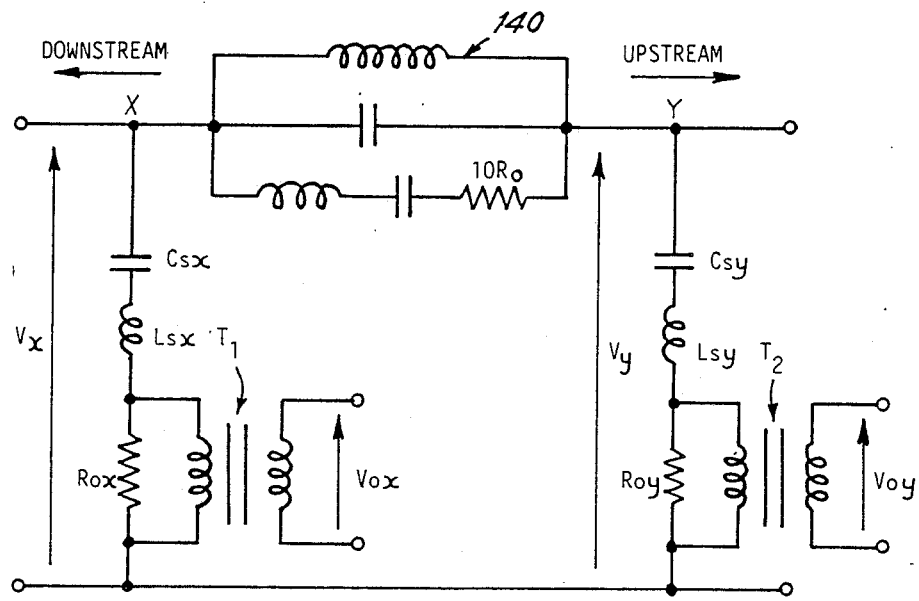
Figure 12:
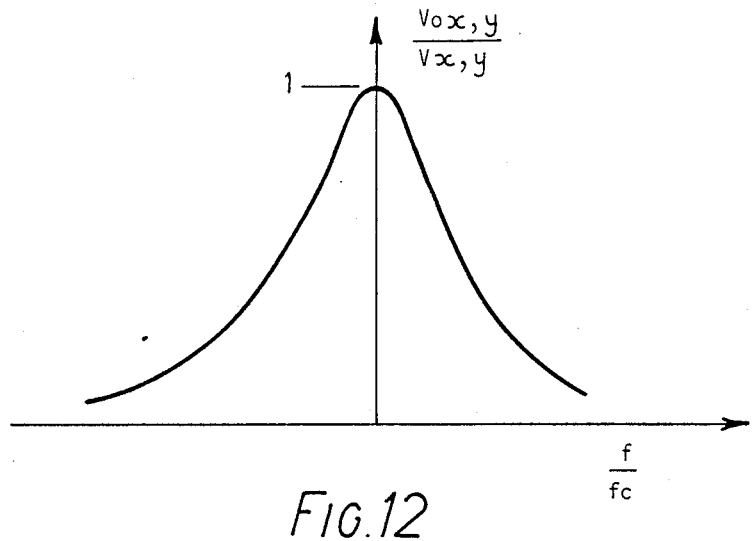
Figure 13:
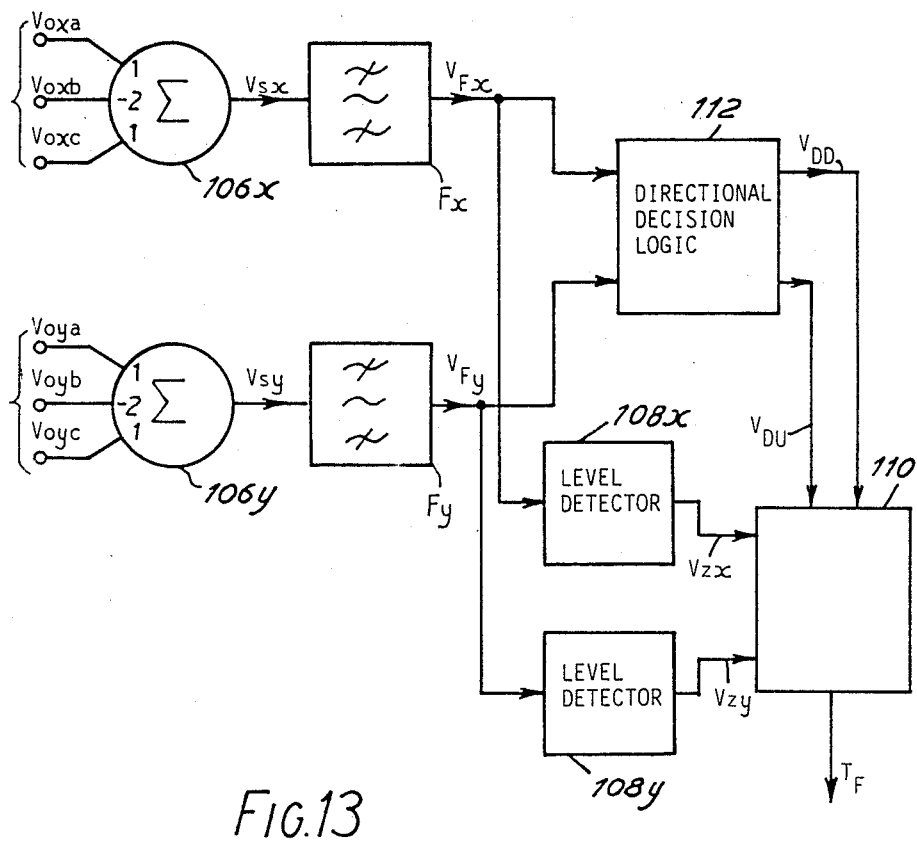

Embodiments of the present invention will hereinafter be described, by way of example, with reference to the accompanying drawings, in which;

FIG. 1 show schematically a method of the invention for detecting and discriminating faults on a transmission line, FIG. 2 shows one embodiment of a tuning circuit implementing the switches shown in FIG. 1, FIG. 3 shows the input impedances of the circuit of FIG. 2 relative to a normalised frequency, FIG. 4 shows schematically a discriminating circuit for generating a trip signal, FIG. 5 illustrates the operation of the circuit of FIG. 4, FIG. 6 illustrates the operation of the circuit of FIG. 4 under particular conditions, FIG. 7 illustrates an alternative mode of operation of the circuit of FIG. 4, FIG. 8 illustrates the use of line trap circuits, FIG. 9 shows a line trap circuit and its frequency response, FIG. 10 shows schematically a distribution feeder protected by apparatus of the invention, FIG. 11 shows an embodiment of a detecting and locating circuit for the apparatus of FIG. 10, FIG. 12 shows the voltage transfer characteristic of a tuned circuit of the circuit of FIG. 11, FIG. 13 shows an embodiment of a discriminating circuit of the apparatus of FIG. 10, and FIGS. 14 and 15 show the waveforms of discriminating circuits of the apparatus of FIG. 10 illustrating the discrimination between differently located faults.

FIG. 1 illustrates schematically the basic principles of the present invention for detecting and discriminating faults in transmission systems. FIG. 1 shows one protected circuit of the system, for example, a transmission line 2 of the transmission system. In known manner, a respective circuit breaker 4 is provided at each end of the line 2 so that the line can be isolated from the transmission system by tripping the two circuit breakers 4. Of course, it is important to ensure that the line 2 is not isolated without good reason. In known manner, each end of the protected line 2 is coupled to additional lines (not shown) which are similarly protected.

In practice, the protected line 2 may be a power line of an extremely high voltage (EHV) transmission system, extending between two transformer substations, and carrying voltages in excess of 150 kV at power frequency, for example at 50 or 60 Hz. The length of each power line 2 will depend upon the particular power system involved, but could for example, be in the range 20km to 600km.

At each of its ends S and R, the protected line 2 is provided with a high speed directional detector DD. Such detectors are known and generate locative signals upon the occurrence of faults. The directional detectors DD illustrated are used to indicate whether a fault occurring is in the forward or reverse direction relative to the respective detector. The forward and reverse direction for each detector DD is indicated on FIG. 1.

It will be seen that at each end of the line 2 there is also provided a respective switch $S_S$ and $S_R$ for coupling the protected line to earth or to a respective discriminating circuit $D_S$, $D_R$.

The switches $S_S$ and $S_R$ are hypothetical switches, being implemented, as will be described below, by tuned circuits which also act as detector means to detect the existence of signals in the protected line having a frequency within a predetermined frequency band. The switches $S_S$ and $S_R$ are arranged to present either a short circuit or an open circuit to any signals having a frequency within the predetermined frequency band. In this respect, it has been discovered that whatever the fault which arises on high voltage power lines, there is always arcing and/or discharging caused which induces high frequency noise. Generally, the noise signals produced by faults are wideband, but the switches $S_S$ and $S_R$ are generally arranged to present the short circuit or an open circuit to a relatively narrow band of high frequencies.

Let us consider initially the operation of the arrangement shown in FIG. 1 when the switches $S_S$ and $S_R$ are normally closed such that they present a short circuit at the frequencies of interest. Let us then consider the operation if a fault $F_1$ occurs which is external to the protected line 2. When the fault $F_1$ occurs, the directional detector DD at end S will detect a reverse direction fault and the switch $S_S$ will remain normally closed and short any high frequency signals arriving to ground. The directional detector DD at end R will detect a forward direction fault and in response to this is arranged to open the switch $S_R$. However, because the high frequency signal is shorted by the switch $S_S$ no high frequency signals are received by the discriminating circuit $D_R$.

Let us again consider the operation of FIG. 1 where the switches $S_S$ and $S_R$ are normally closed, but in the case where an internal fault $F_2$ arises. In this situation each of the directional detectors DD will detect a fault in its forward direction and each will cause its associated switch $S_S$ and $S_R$ to open. High frequency signals within the predetermined range are therefore received by the discriminating circuits $D_S$ and $D_R$ which are arranged to generate respective output signals $T_S$ and $T_R$ as described below. These trip signals $T_S$ and $T_R$ trip the circuit breakers 4 so that the power line 2 is correctly isolated.

Let us now consider the second case, where the switches $S_S$ and $S_R$ are normally open at the frequencies of interest. In this situation, the directional detectors DD are arranged to alter the state of the switches if they detect a fault in the reverse direction. Thus, the occurrence of the fault $F_1$ causes the detector at S to output a reverse direction signal to close $S_S$ and thereby short the high frequency signals to earth. The high frequency signals are thus inhibited from reaching the switch $S_R$, and hence the discriminating circuit $D_R$. When the internal fault $F_2$ occurs, both switches $S_S$ and $S_R$ remain open such that signals within the frequency band of interest are received by the discriminating circuits $D_S$ and $D_R$ and cause the generation of output trip signals $T_S$ and $T_R$.

It will thus be seen from the above, that the circuit shown schematically in FIG. 1 is capable of both detecting and discriminating faults without communication between the discriminating circuits $D_S$ and $D_R$ associated with each end of the power line 2 being necessary. Thus, in a simple manner, the method and apparatus described is able to effectively discriminate between internal and external occurring faults.

Although faults generally produce wideband noise, it is preferred that the discriminating circuits $D_S$ and $D_R$ be tuned to a predetermined narrow band. In a preferred embodiment, the discriminating circuits $D_S$ and $D_R$, and the switches $S_S$ and $S_R$ are all tuned to a narrow band of about ±5 kHz about a centre frequency of 300 kHz.

FIG. 2 shows one practical implementation of the switches $S_S$ and $S_R$. Each circuit as shown in FIG. 2 is coupled to one end of the transmission line 2. The arrangement of FIG. 2 has the advantage that it utilizes existing equipment already coupled to the end of the transmission line.

At each end of a transmission line, as 2, a capacitor voltage transformer is commonly provided for coupling transformed voltages to other devices. Such a capacitor voltage transformer includes a coupling or stack tuning capacitor $C_C$, commonly of the order of 2000 picofarads.

It will be seen from FIG. 2 that each of the switches $S_S$ and $S_R$ is synthesized by a circuit which is arranged to tune with the stack tuning capacitance $C_C$. The values of the circuit components of FIG. 2 may be chosen either so that the input impedance presented to signals within the predetermined frequency range is small, approximating to the switches $S_S$ and $S_R$ presenting short circuits at the frequencies of interest. Alternatively, the circuit of FIG. 2 can be arranged to present a very large input impedance at the frequencies of interest, to approximate to the switches $S_S$ and $S_R$ providing an open circuit at the frequencies of interest.

It will be seen that the circuit of FIG. 2 comprises a parallel arrangement of a capacitor $C_2$, an inductor $L_2$ and a switch S connected to the stack tuning capacitor $C_C$ by way of a further inductor $L_1$. A resistance $R_L$ shown in series with the inductor $L_1$ represents the losses in the tuned circuit and is typically less than 50Ω. The parallel connection of the capacitor $C_2$, the inductor $L_2$, and the switch S is connected to ground by way of a small resistance R arranged to provide an output voltage $V_0$, when the switch S is closed, which is proportional to any current within the frequency range of interest shunted to ground. Similarly, when the switch S is open, the output voltage $V_0$ is proportional to the voltage developed across the inductor $L_2$ and the resistance R by signals within the frequency range of interest.

The band of frequencies over which the circuit of FIG. 2 is tuned is chosen for any given value of a stack tuning capacitance $C_C$ by suitable choice of the values of the inductors $L_1$ and $L_2$ and of the capacitance $C_2$. If necessary, a further parallel combination of a capacitor and inductor can be connected in series with the resistance R to increase the tuned band and/or the frequency range over which, with the switch S closed, the circuit impedance is minimal.

As is made clear above, it is generally preferred to tune the circuit of FIG. 2 to a centre frequency of 300 kHz. Of course, if this is rendered unsuitable by other conditions, such as by the frequency of any carrier signalling channels, the circuit components of the tuner of FIG. 2 can be accordingly adjusted.

FIG. 3 shows a typical plot of the input impedance |Zin| of the stack tuning circuit of FIG. 2, as viewed from its connection to the line 2, both when the switch S is open and the switch S is closed. The response is shown against frequency, normalised with respect to the centre frequency of 300 kHz. It will be seen from FIG. 3, then when the switch S is closed, the tuning circuit presents an input impedance of less than 10Ω over the frequency band 300±5 kHz and thus approximates to a short circuit. When the switch S is open substantially all of the signal within the frequency band is fed by way of a transformer T to the output $V_0$. In this respect, the series combination of capacitor $C_C$ and inductor $L_1$ is near series resonance at 300 kHz.

It will be appreciated that FIG. 3 also illustrates the voltage transfer characteristics of the stack tuning circuit of FIG. 2 under the two alternative conditions of operation.

As made clear above, a respective stack tuning circuit of FIG. 2 is used to implement the switches $S_S$ and $S_R$. The switches S within the stack tuning circuits are conditioned by way of the signals from the directional detectors. The voltage $V_0$ at the output of each stack tuning circuit is then coupled to a respective discriminating circuit $D_S$, $D_R$ for identifying fault conditions and generating a respective trip signal $T_S$, $T_R$ for tripping the relevant circuit breaker 4 as appropriate.

It would, of course, be possible to rely upon the discrimination provided by the stack tuning circuit of FIG. 2, and thus to provide appropriate detecting and signal generating means directly connected to the output $V_0$. For example, a threshold detector circuit could be arranged to receive the output $V_0$ and generate an output signal in response thereto.

However, because it is so very important that circuits, for example, power lines of an EHV transmission system, are not isolated without good reason, the further level of discrimination provided by the discriminating circuits $D_S$, $D_R$ is preferably supplied. These discriminating circuits $D_S$, $D_R$ are arranged to distinguish fault induced noise from external interference for example, radio transmissions.

FIG. 4 shows one embodiment of a discriminating circuit $D_S$, $D_R$ arranged to receive the output voltage $V_0$ from an associated stack tuning circuit. In fact, the three lines each carrying one phase of a three-phase supply, are each provided with a respective stack tuning circuit, and the output $V_0$ of each phase is fed to a single discriminating circuit as shown in FIG. 4.

It will be seen that the three output voltages of the three phases, $V_{0a}$, $V_{0b}$ and $V_{0c}$ are first of all fed to a summation circuit 6 where they are combined using aerial mode components of propagation. Thus, the three outputs may be combined using a 1,0,−1, or generally a k,0,−k combination. Alternatively, the three outputs can be combined using a 1,−2,1, or more generally a n,−2n,n combination as is illustrated in FIG. 4. The n,−2n,n combination is particularly convenient because it causes any common mode signals induced in the power lines from a remote source to be cancelled. Equally importantly, this particular combination also reduces any signals within the predetermined frequency range which are detected in a healthy circuit as a consequence of a fault in an adjacent circuit in double circuit or parallel feeder arrangements.

The summation circuit 6 in the circuit of FIG. 4 produces an output $V_S$ which is fed to a narrow band filter F. Preferably, this filter F is a band pass filter tuned to the same centre frequency as the stack tuning arrangements. Thus, the filter F will admit only those frequency signals which, with the switches S closed, are almost perfectly shorted to ground. Conversely, when the switches S are open, the filter F passes only those frequency components which have suffered the least attenuation in the stack tuning arrangements. With the stack tuning circuits as described above in connection with FIG. 2, the narrow band filter of the circuit of FIG. 4 will have a bandwidth of the order of 10 kHz. The filter F therefore acts to provide additional tuning.

The filtered output voltage $V_F$ of the filter F is applied to a level detector circuit 8 which is arranged to produce an output voltage $V_D$ where its input voltage $V_F$ is above a threshold voltage $V_T$. That is, $V_D = 1$, where $V_F > V_T$, and $V_D = 0$, where $V_F < V_T$.

The threshold voltage $V_T$ is set so that any noise in the output signal $V_F$ from the filter F, for example, generated by the filter F, the stack tuning arrangement, or the summation circuit, is effectively ignored. The level of the threshold voltage $V_T$ can also be set to control the sensitivity of the equipment to system faults. In a practical arrangement, the level of the threshold voltage $V_T$ is typically a minimum of 1,000th of the maximum signal level which appears at the output of the filter F. For example, $V_T$ has the value of 20 mV where the narrow band filter F has a bandwidth of 10 kHz cent red on the frequency 300 kHz.

The output $V_D$ of the level detector 8 is applied to logic means 10. The forward/reverse signals generated by the associated directional detector DD which were used to set the switches S in the stack tuning circuits, are also applied to the logic means 10. The logic means 10 generates a trip signal $T_S$ or $T_R$ if it receives both a high signal, i.e. $V_D = 1$, from the level detector 8, and an appropriate forward or reverse signal from the associated directional detector DD.

FIG. 5 shows the waveforms produced by the discriminating circuits $D_S$ and $D_R$ provided at both ends of a protected line 2, and, in particular shows how the discriminating circuits distinguish between internal and external faults.

FIG. 5 illustrates the case where the switches S are normally closed so that the stack tuning circuits normally provide a low impedance to signals within the predetermined frequency band. FIG. 5a illustrates the situation at the discriminating circuits at both ends S and R of the line 2 when an external fault $F_1$ as shown in FIG. 1 occurs. At time $t_o$, the fault $F_1$ occurs and high frequency signals are generated which are detected at the end S, as illustrated by the voltage $V_F$ passed by the filter F at end S, and by the high level signal $V_D$ at end S. Of course, at time $t_o$ there is no forward signal from the directional detector DD at the end S, and at time $t_1$ this detector produces a reverse signal. Accordingly, no trip signal $T_S$ is generated. The stack tuning arrangement at end S shorts the high frequency signals received to ground so that there is little high frequency received by the stack tuning arrangement at end R, as illustrated by the trace of the voltage $V_F$ at end R. The output $V_D$ at end R therefore remains at low level, i.e. $V_D = 0$. However, the directional detector DD at R, for example at time $t_2$, detects the fault and generates a forward signal. However, as this forward signal is provided in conjunction with a low level $V_D$ output, no trip signal $T_R$ is produced. As previously described, the forward signal at end R, opens the switch S in the associated stack tuning circuit.

It will be appreciated from FIG. 5a that the directional detectors DD react very slowly compared to the stack tuning and discriminating circuits. It is therefore conceivable that the pulse $V_D$ could change from one to the zero logic level before a forward signal is generated by the appropriate directional detector DD. This potential problem is averted by pulse stretching any signal $V_D$ generated by appropriate operation of the logic means 10.

FIG. 5b shows the operation when an internal fault $F_2$ occurs at time $t_o$ such that high frequency signals $V_F$ are output from the filters F of both discriminating circuits $D_S$ and $D_R$. Thus, at both ends S and R the output $V_D$ of the level detector changes from 0 to 1. Thereafter, the directional detectors DD at both of the ends S and R will produce forward signals which are used to open the switches S at each end and are also applied to the logic means 10 in the respective discriminating circuits $D_S$ and $D_R$. In the situation illustrated in FIG. 5b, the fault $F_2$ is nearer to the end R and thus the forward signal at that end is provided at time $t_1$, at which time a trip signal $T_R$ is generated to trip the circuit breaker 4 at that end of the line 2. Subsequently, at time $t_2$, the directional detector DD at end S produces a forward signal. As the output $V_D$ at the end S still remains at one the trip signal $T_S$ is also generated. Thus, the line 2 has been isolated from the transmission system.

The application to each discriminating circuit of a signal having a frequency within the range of interest together with a forward signal from the directional detector is sufficient to generate a trip signal for the associated circuit breaker. At first sight therefore, it might appear that the use of the forward signal from the directional detector to additionally open the switch S in the stack tuning circuit is unnecessary. However, where faults occur close to one end of the line 2, the signals transmitted to the remote end would be very small if the local tuning circuit remained an effective short circuit to that signal. By opening the switch S in the local tuning circuit, it is ensured that a sufficient signal is transmitted to the remote end. This case is illustrated in FIG. 6 which shows the situation where a fault occurs close to the end S. It will be appreciated from FIG. 6 that until the forward signal from the directional detector DD at end S opens the switch S in the associated stack tuning circuit, insufficient high frequency signal is transmitted to the end R to produce an output voltage $V_D$ at level one. In all other respects, the operation in FIG. 6 is the same as that described above with reference to FIG. 5b so that further description thereof is not required.

FIG. 7 illustrates the mode of operation where the switches in the stack tuning circuit at the ends of the protected line 2 are normally open and are closed to provide an effective short circuit by the production of a reverse signal by the appropriate directional detector DD.

FIG. 7a shows the situation where an external fault $F_1$ occurs at time $t_o$, causing high frequency signals to be detected by the discriminating circuit $D_S$ as shown by the waveform $V_F$ and the production of a one signal at the output $V_D$ of the level detector at end S. This high frequency signal is similarly detected at the end R. At time $t_1$, the directional detector DD at end S produces a reverse signal, which clearly does not cause the discriminating circuit $D_S$ to produce any trip signal. However, this reverse signal does close the switch S in the stack tuning circuit at end S such that the high frequency signals are effectively short circuited and are therefore no longer transmitted to the end R, where the output $V_D$ changes from one to zero. At time $t_2$, the directional detector DD at end R produces a forward signal, but as $V_D$ is now at zero, no trip signal is generated.

FIG. 7b, illustrates the operation upon the occurrence of a fault $F_2$ internal to the protected line 2 where the switches S are normally open. Again, the occurrence of the fault at $F_2$ causes the high frequency signals $V_F$ to be detected at each end and thus the output signals $V_D$ to change to the one level. At time $t_1$ the directional detector DD nearest the fault, that is at end R, produces a forward signal, and hence a trip signal $T_R$ is generated. The switch S in the stack tuning circuit at end R remains open circuit. At time $t_2$, the directional detector DD at end S produces a forward signal which, because of the level one $V_D$ signal persisting, causes the trip signal $T_S$ to be generated.

FIGS. 7a and 7b again underline the need to ensure that the output voltage $V_D$ remains at level one for a time sufficient to allow for the relatively slow operation of the directional detectors. However, it will be apparent from consideration of the operation at end R in FIG. 7a, that care needs to be taken in determining the extent to which the pulse $V_D$ is stretched. Thus, it will be appreciated from FIG. 7a that if the pulse $V_D$ at end R is stretched to overlap with the forward signal subsequently provided by the directional detector, an erroneous signal $T_R$ would be generated. This of course, compromises the security of the scheme.

In general, the mode of operation in which the stack tuning circuits are operated with their switches S normally closed, that is in the short circuit condition, provides the highest levels of security and dependability in practical operations.

As has been made clear above, the centre frequency to which the stack tuning circuit and the narrow band filter are tuned, can be chosen as required. However, care must be taken where the bus bar to ground capacitance in a sub-station approaches a value at which its reactance at the chosen frequencies corresponds to a shunt.

FIG. 8 schematically illustrates the situation which could arise where a large number of lines are terminated at a particular bus bar B which produces a bus bar to ground capacitance of the order of 0.2 $\mu$F.

At a centre frequency of the order of 300 kHz, such a capacitance corresponds to a shunt. It is evident then, that at a relatively high centre frequency, for example 300 kHz, the line can be effectively shorted at its ends by an impedance which is less than the stack tuning impedance when this is switched to its "short circuit mode". Of course, this would destroy the discrimination of the circuit of FIGS. 2 and 4.

Therefore in choosing the centre frequency, the bus bar capacitive reactance must be considered. Ideally, the capacitive reactance should be at least of the order of 3 times the impedance of the stack tuning circuits when operating in the short circuit mode.

Where the choice of centre frequency is limited and the shunt reactance is unduly low, it is possible to apply line trap circuits 14. An example of a line trap circuit, which is conventional, is shown in FIG. 9a. The circuit shown in FIG. 9a effectively presents an impedance over a predetermined frequency band, which approximates closely to the line characteristic or surge impedance. The frequency response of the line trap circuit at FIG. 9a is shown in FIG. 9b plotted against frequency normalised with respect to the centre frequency.

The bus bar capacitive reactance is relatively low so that for most practical purposes the line should be ideally terminated by line traps. At the frequencies of interest, the line trap would commonly present a resistance of the order of 300Ω and this is sufficient to overcome any discrimination problems which may be caused when there is a restriction on the choice of centre frequencies.

It is also possible to provide means to modulate the high frequency signals to avoid problems when the choice of centre frequency is restricted, and/or to aid fault detection. For example, modulation could be simply achieved by causing the periodic opening and closing of the switches S in the stack tuning circuits.

FIGS. 10 to 15 illustrate a further embodiment of the invention which is particularly useful for detecting and discriminating faults in lower voltage distribution systems, for example, having power lines carrying voltages of the order of 11 kV.

FIG. 10 shows schematically a distribution feeder which is divided into a number of individual protected lines 102. As previously, a circuit breaker 104 is provided at each end of each line 102 so that the line can be isolated from the distribution feeder. A number of detecting and locating circuits DL, are spaced along the distribution feeder such that a respective locating circuit DL is provided at each end of each protected line 102. Of course, it will be appreciated that each locating circuit DL receives signals from the two lines 102 with which it is connected.

The detecting and locating circuits DL are tuned to a relatively narrow band of frequencies, even though, as described above, a fault in the system generally produces wideband noise. The centre frequency is preferably in the range 50 Hz to 500 kHz, a value of 300 kHz again being typical, and the band may be about ±5 kHz about that centre frequency.

Each locating circuit DL has two outputs, each connected to a respective discriminator circuit DDD. The locating circuits DL are responsive to the narrow band frequencies of interest and their output signals indicate whether a fault is present. However, a trip signal $T_F$ is only generated when the indication of the presence of a fault is accompanied by an appropriate locative signal. In this respect, each discriminator circuit DDD is arranged to generate locative signals to indicate the location of a fault from the two outputs received from the respective locating circuit DL.

In the earlier embodiments, a switch was provided at each end of each line 2 to prevent high frequency signals at one end of the line reaching the other end of the line. Such switches are not provided in the embodiment of FIG. 10. The switches are not needed because, as we shall see, the frequencies of interest on the line are attenuated by the detecting and locating circuits DL.

FIG. 11 shows one practical implementation of a detecting and locating circuit DL connected at one input terminal X to a downstream protected line 102, and at a second input terminal Y to an upstream protected line 102. These input terminals X and Y are connected by a line trap circuit 140 which has the same, substantially conventional configuration, as the line trap circuit 14 of FIGS. 8 and 9. The line trap circuit 140 is nominally tuned to the centre frequency fc chosen, for example, to 300 kHz, and typically has an impedance of about 10 Ro at that frequency, where Ro is the line surge impedance. Its frequency response, normalised with respect to the centre frequency will have a similar shape to that of FIG. 9b, except that its impedance at the centre frequency will approximate to ten times the surge impedance, rather than approximately equal to it as previously.

Each side of the line trap circuit 140 is connected to a non-switched stack tuner circuit comprising a series arrangement of a capacitor Csx, Csy, and an inductor Lsx, Lsy. The output voltage Vox, Voy is taken across a respective series resistor Rox, Roy and fed to the output by way of a respective isolation transformer T1, T2. Each tuned circuit is arranged to have its minimum impedance at the centre frequency fc, and this minimum impedance is substantially equal to the line surge impedance Ro. The voltage transfer characteristic of each stack tuner circuit normalised with respect to the centre frequency is illustrated in FIG. 12.

Let us consider the operation of the system of FIG. 10 by looking at the operation of the detecting and locating circuit $DL_2$ when faults occur at locations $F_1$ and $F_2$ illustrated in FIG. 10.

Firstly, consider the operation if a fault $F_2$ occurs which is external to the two protected lines 102 directly connected to the locating circuit $DL_2$. When the fault $F_2$ occurs, high frequency signals are impressed on the line at that point. These signals arrive at the locating circuit $DL_3$ and output signals $Vox_3$ and $Voy_3$ are applied to the discriminator circuit $DDD_3$. We will see later, that in this situation, the discriminator circuit $DDD_3$ will output a trip signal $T_F$. The high frequency signals arriving at the locating circuit $DL_3$ are fed towards the locating circuit $DL_2$ but are attenuated by the line trap circuit 140. For example, the level of the in-band signals at terminal $X_3$ with the particular circuit parameters suggested will be approximately (1/21)th of the original signal level at terminal $Y_3$. The level of the in-band signals arriving at the locating circuit $DL_2$ is therefore relatively low and the respective discriminator circuit $DDD_2$ is arranged not to output trip signals in response to such low level signals.

If an internal fault $F_1$ occurs, the whole of the high frequency signal arrives at both the locating circuits $DL_2$ and $DL_3$ and their discriminators $DDD_2$ and $DDD_3$ are arranged to output trip signals. However, these signals are attenuated by the line trap circuits 140 of the two locating circuits $DL_2$ and $DL_3$ such that only low level high frequency signals are received elsewhere along the line.

It will be apparent from the above, that the detecting and locating circuits DL are responsive to the existence of in-band signals to detect the occurrence of a fault. Furthermore, and as previously, the discriminating circuits DDD also consider the level of the in-band signal as a further degree of discrimination in establishing the existence of a fault. However, rather than using separate direction detectors to produce location information, as previously, the arrangement of FIGS. 10 and 11 also utilizes the level of the in-band signal to provide locative signals. As will be seen below, each locating circuit DL compares the level of the signals on each of its input terminals to establish the direction of the fault.

FIG. 13 shows an embodiment of a discriminator circuit DDD arranged to receive the output voltages Vox and Voy from an associated detecting and locating circuit DL. In fact the three lines each carrying one phase of a three-phase supply, are each provided with a respective detecting and locating circuit DL and the outputs Vox and Voy of each phase are fed to a single discriminator circuit as shown in FIG. 13.

It will be seen that the three output voltages Voxa, Voxb, Voxc, of the three phases at one side of the locating circuit DL are first of all fed to a summation circuit 106x where they are combined using aerial mode components of propagation. Thus, the three outputs may be combined using a 1,0,−1, or generally a k,0,−k combination. Alternatively, the three outputs can be combined using a 1,−2,1, or more generally a n,−2n,n combination as is illustrated in FIG. 13. The n,−2n,n combination is particularly convenient because it causes any common mode signals induced in the power lines from a remote source to be cancelled. Equally importantly, this particular combination also reduces any signals within the predetermined frequency range which are detected in a healthy circuit as a consequence of a fault in an adjacent circuit in double circuit or parallel feeder arrangements.

The summation circuit 106x in the circuit of FIG. 13 produces an output Vsx which is fed to a narrow band filter $F_x$. Preferably, this filter $F_x$ is a band pass filter tuned to the same centre frequency as the stack tuning arrangements. Thus, the filter $F_x$ will pass only those frequency signals which are in-band. Preferably, the narrow band filter $F_x$ has a bandwidth of the order of 10 kHz and therefore acts to provide additional tuning.

The filtered output voltage $V_{Fx}$ of the filter $F_x$ is applied to a level detector circuit 108x which is arranged to produce an output voltage $V_{zx}$ where its input voltage $V_{Fx}$ is above a threshold voltage $V_T$. That is, $V_{zx}=1$, where $V_{Fx}>V_T$, and $V_{zx}=0$, where $V_{Fx}<V_T$.

The threshold voltage $V_T$ is set so that any noise in the output signal $V_{Fx}$ from the filter $F_x$, for example, generated by the filter $F_x$, the stack tuning arrangement, or the summation circuit, is effectively ignored. The level of the threshold voltage $V_T$ can also be set to control the sensitivity of the equipment to system faults. In a practical arrangement, the level of the threshold voltage $V_T$ is typically a minimum of 1,000th of the maximum signal level which appears at the output of the filter $F_x$. For example, $V_T$ has the value of 20 mV where the narrow band filter $F_x$ has a bandwidth of 10 kHz cent red on the frequency 300 kHz.

It will be seen that the three output voltages Voya, Voyb, Voyc of the three phases at the other side of the locating circuit DL are treated in substantially exactly the same manner as described above with reference to voltages Voxa, Voxb, Voxc. Thus, the voltages Voya, Voyb, Voyc are summed by a summation circuit 106y, the summed output is filtered by a narrow band filter $F_y$ and then the filtered output signal $V_{Fy}$ is applied to a level detector circuit 108y such that comparison with a threshold voltage $V_T$ determines the output signal $V_{zy}$.

The outputs $V_{zx}$ and $V_{zy}$ of the level detectors 108 are applied to logic means 110. Locative information signals, generated by the discriminator circuit DDD are also applied to the logic means 110. The logic means 110 generates a trip signal $T_F$ if it receives both a high signal, i.e. $V_{zx}$ or $V_{zy}=1$, from a level detector 108, and an appropriate locative information signal.

It will be seen from FIG. 13 that the two output signals $V_{Fx}$ and $V_{Fy}$ from the narrow band filters $F_x$ and $F_y$ are fed to a directional decision logic circuit 112. It will be appreciated that the level of these signals will have been determined in dependence upon the location of the fault. For example, for the locating circuit $DL_2$, if the internal fault $F_1$ occurs upstream the whole high frequency response will appear at the input terminal $Y_2$, whilst the line trap circuit 140 will attenuate the input signal at the terminal $X_2$. This means that the output signal Voy will be very much greater than the output signal Vox, probably by an order of 1:21. Similarly the signal $V_{Fx}$ output from the narrow band filter $F_x$ will be very much smaller than the signal $V_{Fy}$. The directional decision logic circuit 112 compares the two signals $V_{Fx}$ and $V_{Fy}$. If $V_{Fy}$ is greater than $V_{Fx}$, as in this case, a one is produced on the output $V_{DU}$ to indicate the location of the fault is upstream Similarly, if $V_{Fx}$ is greater than $V_{Fy}$ a one appears on the output $V_{DD}$ to indicate a downstream fault.

The fault location signals $V_{DU}$ and $V_{DD}$ are applied to the logic means 110 which is arranged to produce a trip signal $T_F$ only if a one on $V_{DU}$ (upstream fault) coincides with a one on $V_{zy}$ or a one on $V_{DD}$ (downstream fault) coincides with a one on $V_{zx}$.

Figures 14A, 14B, 14C:
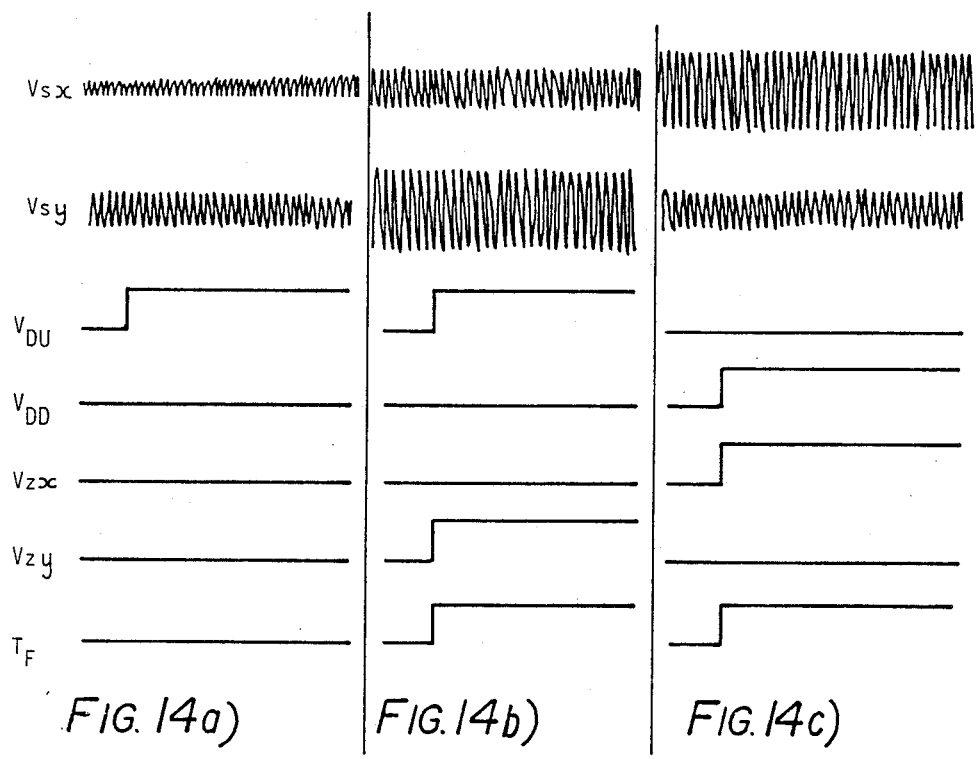

FIG. 14 shows the waveforms of the discriminator circuits $DDD_1$, $DDD_2$ and $DDD_3$ for the fault $F_1$ occurring between terminals $X_3$ and $Y_2$ (FIG. 10). These waveforms indicate how internal and external faults are discriminated. FIG. 14b shows the waveforms at discriminator circuit $DDD_2$ which is associated with locating circuit $DL_2$ to which the fault $F_1$ is internal and upstream. When the fault $F_1$ occurs high frequency signals are generated and are passed substantially without attenuation by the upstream side of discriminator circuit $DDD_2$ such that a high level, in-band signal $V_{sy}$ is applied to the narrow band filter $F_y$. The high frequency signals are attenuated by the line trap circuit of discriminator circuit $DDD_2$ such that the level of the signal $V_{sx}$ applied to its filter $F_x$ is less than the level of $V_{sy}$. Accordingly, the output of the direction decision logic circuit 112 is a low on $V_{DD}$ but a high on $V_{DU}$ as illustrated. The high level signal $V_{sy}$ is applied by the filter $F_y$ to the level detector 108y whose output $V_{zy}$ will thus be high, whilst the output $V_{zx}$ of level detector 108x is low, again as shown in FIG. 14b. The high signals $V_{DU}$ and $V_{zy}$ applied to the logic means 110 cause a trip signal $T_F$ to be produced.

Similarly, as shown in FIG. 14c, the internal, downstream fault $F_1$ causes a high level signal $V_{sx}$ and an attenuated signal $V_{sy}$ to be received by the discriminator circuit $DDD_3$. It will be appreciated that these signals cause $V_{DD}$ and $V_{zx}$ to go high, so that again a trip signal $T_F$ is generated.

The discriminator circuit $DDD_1$ receives attenuated high frequency signals $V_{sx}$ and $V_{sy}$ as shown in FIG. 14a such that neither $V_{zx}$ nor $V_{zy}$ goes high and such that no trip signal $T_F$ is produced. However, it will be appreciated that as the high frequency signals have been further attenuated by the line trap circuit of the locating circuit $DL_1$, $V_{sy}$ is greater than $V_{sx}$ such that $V_{DU}$ goes high to indicate an upstream fault.

FIGS. 15a, 15b, 15c show the waveforms at discriminator circuits $DDD_1$, $DDD_2$ and $DDD_3$ respectively for the fault $F_2$ occurring upstream of terminal $Y_3$. FIG. 15 shows graphically that whilst every discriminator circuit is able to recognize that the fault is upstream, only the discriminator circuit $DDD_3$, to which the fault $F_2$ is internal, outputs a trip signal because there is not a sufficient level in any of the high frequency signals applied to the discriminator circuits $DDD_1$ and $DDD_2$ to produce a high output from their level detectors 108x or 108y. FIG. 15 also illustrates the progressive attenuation of the high frequency signal as it travels through the protected lines 102 and the detecting and locating circuits $DL_3$ to $DL_1$.

For simplicity FIG. 10 shows a configuration of a distribution feeder in which a circuit breaker 104 is provided at each end of each protected line 102. However, in some distribution systems breakers are not necessarily present at regular intervals. In this case, the invention may be used to indicate the location of faults rather than to isolate faulty lines.

Furthermore, it will be appreciated that the distribution system may have other configurations to that shown in FIG. 11. For example, line taps, spurs and the like may be provided. Of course, appropriate detecting and locating circuits DL may still be associated with the individual lines of the distribution system.

In FIG. 11, the output voltage Vox, Voy is shown taken across a series resistor. It would, of course, be possible to derive the output voltage across an inductor alone, or across a circuit including an inductor and/or a resistor. Similarly, the derivation of the output voltage in the circuit of FIG. 2 may be chosen as required.

In the embodiments specifically described with respect to EHV transmission systems, the stack tuning circuits utilize the stack tuning capacitor which already exists in the capacitor voltage transformer commonly provided at the end of a transmission line. This is advantageous because of the problems of providing a capacitor with a sufficiently high capacitance for use at the transmission line voltages. Such problems do not arise at most distribution system voltages. Here it is possible to use a directly connected capacitor for the capacitors Csx and Csy of FIG. 11 or a concentric capacitor separated from the high voltage conductor of the protected line by a suitable insulating dielectric, for example, a polymeric insulating material.

The invention has been described above with reference to the discrimination of faults in EHV transmission systems, and in distribution systems, and clearly the invention has general applicability to all transmission and distribution systems. In addition, the invention is generally applicable to any electrical system where faults generate signals having frequencies within a predetermined band, and in the claims and in the preamble to the specification the terms "transmission circuit" and "transmission system" are used to refer generally to electrical circuits and systems in which high frequency faults are generated.

It will be appreciated that modifications and variations can be made to the invention as described above within the scope of the appended claims

I claim:

1. In a transmission circuit having a discriminating means coupled to the transmission circuit for receiving signals therefrom, a method of detecting and discriminating faults comprising the steps of detecting the existence of signals in the circuit having a frequency within a predetermined frequency range, generating one or more locative signals in response to a fault, said discriminating means being responsive to signals within said predetermined frequency range and to said locative signals, and causing said discriminating means to output a fault signal only when said discriminating means receives one or more selected locative signals within a time period in which the existence of signals within said predetermined frequency range is detected.

2. A method according to claim 1, wherein the discriminating means is coupled to a transmission circuit which includes three lines carrying the three phases of one supply.

3. A method according to claim 2, wherein the signals received by the discriminating means from the three phases are combined, and wherein the discriminating means is caused to output a fault signal only when the combined received signals have a frequency within said predetermined frequency range and are received within a time period in which said one or more preselected locative signals are received.

4. A method according to claim 3, wherein the received signals are combined by summation in accordance with the formula k,o,−k.

5. A method according to claim 3, wherein the received signals are combined by summation in accordance with the formula n,−2n,n.

6. A method according to claim 1, wherein a plurality of discriminating means are provided with respective discriminating means being coupled to each end of the transmission circuit, and wherein each discriminating means is arranged to be conditioned by the locative signals it receives.

7. A method according to claim 6, wherein said locative signals are generated by detector means associated with each end of each circuit, and wherein the locative signals generated by each detector means are applied to the discriminating means coupled to the end of the circuit with which the detector means is associated.

8. A method according to claim 7, wherein each detector means is also coupled to receive signals from an adjacent circuit and is arranged to generate locative signals by comparing the signals received from two adjacent circuits.

9. A method of protecting a transmission system against faults, the transmission system including one or more transmission circuits and a plurality of discriminating means, respective discriminating means being coupled to each end of each transmission circuit for receiving signals therefrom, the method comprising the steps of detecting the existence of signals in each transmission circuit having a frequency within a predetermined frequency range, generating one or more locative signals in response to the occurrence of a fault, each discriminating means being responsive to signals within the predetermined frequency range and to locative signals, and causing each discriminating means to output a fault signal only when said discriminating means receives one or more selected locative signals within a time period in which the existence of signals having a frequency within a predetermined frequency range is detected.

10. A method according to claim 9, wherein isolation means are associated with each transmission circuit, and wherein each said fault signal is arranged to trip isolation means of the transmission circuit associated with the discriminating means outputting said fault signal.

11. A method according to claim 9, wherein each discriminating means is arranged to be conditioned by the locative signals it receives.

12. A method according to claim 9, wherein said locative signals are generated by detector means associated with each end of each circuit, and wherein the locative signals generated by each detector means are applied to the discriminating means coupled to the end of the circuit with which the detector means is associated.

13. A method according to claim 12, wherein each detector means is also coupled to receive signals from an adjacent circuit and is arranged to generate locative signals by comparing the signals received from two adjacent circuits.

14. A method according to claim 9, wherein the or each discriminating means is coupled to a transmission circuit which includes three lines carrying the three phases of one supply.

15. A method according to claim 14, wherein the signals received by the discriminating means from the three phases are combined, and wherein the discriminating means is caused to output a fault signal only when the combined received signals have a frequency within said predetermined frequency range and are received within a time period in which said one or more preselected locative signals are received.

16. A method according to claim 15, wherein the received signals are combined by summation in accordance with the formula k,o,−k.

17. A method according to claim 15, wherein the received signals are combined by summation in accordance with the formula n,−2n,n.

18. A method according to claim 1 or claim 9, wherein said predetermined frequency range is a narrow band.

19. A method according to claim 1 or claim 9, wherein said frequency range is a high frequency range whose lowest frequency is at least 50 Hz.

20. A method according to claim 1 or claim 9, wherein the predetermined frequency range is a narrow band range cent red on a preselected centre frequency.

21. A method according to claim 1 or claim 9, wherein said preselected centre frequency is within the range 50 Hz to 500 kHz.

22. A method according to claim 1 or claim 9, wherein the predetermined frequency range is 300 kHz ±5 kHz.

23. A method according to claim 9, wherein each said discriminating means is tuned to said predetermined frequency range.

24. A method according to claim 1 or claim 9, wherein the locative signals are arranged to indicate whether a fault is forward of, or reverse of, a predetermined point.

25. A method of protecting a transmission system against faults, the transmission system including one or more transmission circuits and a plurality of discriminating means, respective discriminating means being coupled to each end of each transmission circuit for receiving signals therefrom, the method comprising the steps of detecting the existence of signals in each transmission circuit having a frequency within a predetermined frequency range, generating one or more locative signals in response to the occurrence of a fault, each discriminating means being responsive to signals within the predetermined frequency range and to locative signals, and causing each discriminating means to output a fault signal only when said discriminating means receives one or more selected locative signals within a time period in which the existence of signals having a frequency within a predetermined frequency range is detected, each said fault signal being arranged to trip isolation means of the circuit associated with the discriminating means outputting said fault signal, wherein the predetermined frequency range is a narrow band range cent red on a preselected centre frequency, and said preselected centre frequency is within the range 50 Hz to 500 kHz.

26. A method according to claim 25, wherein the or each discriminating means is coupled to a transmission circuit which includes three lines carrying the three phases of one supply, and wherein the signals received by the discriminating means from the three phases are combined, and wherein the discriminating means is caused to output a fault signal only when the combined received signals have a frequency within said predetermined frequency range and are received within a time period in which said one or more preselected locative signals are received.

27. Apparatus for detecting and discriminating faults in a transmission circuit, said apparatus comprising first detector means coupled to said transmission circuit to detect the existence of signals in the circuit having a frequency within a predetermined frequency range, second detector means associated with said transmission circuit and arranged to generate locative signals in response to the occurrence of faults, and discriminating means coupled to said first and second detector means, said discriminating means being arranged to output a fault signal only when said discriminating means receives one or more selected locative signals within a time period in which the existence of signals within said predetermined frequency range is detected.

28. Apparatus according to claim 27, further comprising circuit breaker means in the transmission circuit coupled to said discriminating means, the circuit breaker means being triggerable upon receipt of a fault signal.

29. Apparatus according to claim 27, wherein said discriminating means comprises a circuit tuned to said predetermined frequency range, the output of said tuned circuit being applied to a level detector, and wherein the discriminating means further comprises logic means arranged to receive the output of said level detector and said locative signals and to generate said fault signal when appropriate.

30. Apparatus according to claim 29, wherein said tuned circuit is a band pass filter.

31. Apparatus according to claim 30, wherein said tuned circuit is tuned to a centre frequency of 300 kHz±5 kHz.

32. Apparatus according to one of claims 27, 28 or 29, wherein said second detector means comprises one or more directional detectors each arranged to generate locative signals indicating whether a fault is forward of, or reverse of, a predetermined point.

33. Apparatus according to claim 27, wherein said second detector means is coupled to its associated transmission circuit and to an adjacent transmission circuit, and wherein said detector means further comprises means for comparing signals from the two adjacent circuits and generating locative signals in response to the comparison.

34. Apparatus according to claim 33, wherein said first detector means comprises a first tuned circuit coupled to the associated transmission circuit and a second tuned circuit coupled to the adjacent transmission circuit, said first and second tuned circuits both being coupled to said comparing means and both being tuned to said predetermined frequency range, and wherein said first detector means further comprises attenuator means coupling said first and second tuned circuits.

35. Apparatus according to claim 34, wherein said first detector means comprises a stack tuning circuit coupled to said transmission circuit.

36. Apparatus according to claim 35, wherein said stack tuning circuit includes a coupling capacitance of a capacitance voltage transformer which is also coupled to the transmission circuit.

37. Apparatus according to claim 35 or 36, wherein said stack tuning circuit is arranged as a band pass filter which is tuned to approximate to a short circuit to signals within said predetermined frequency range.

38. Apparatus according to claim 35 or 36, wherein said stack tuning circuit is arranged to approximate to an open circuit to frequencies within said predetermined frequency range.

39. Apparatus according to claim 35, wherein said stack tuning circuit comprises a parallel combination of a capacitance, an inductor, and a switch, which combination is coupled in series with a high voltage capacitance, and further comprising means for enabling selected locative signals to alter the position of said switch.

40. Apparatus according to claim 39, wherein said high voltage capacitance is the stack capacitor of a capacitor voltage transformer connected to said transmission circuit.

41. Apparatus according to claim 35, wherein said stack tuning circuit is tuned to a frequency of 300±5 kHz.

* * * * *